(12) United States Patent  
Ahlquist et al.

(10) Patent No.: US 12,441,516 B2  
(45) Date of Patent: Oct. 14, 2025

(54) SOUND ATTENUATION FOR MATERIAL HANDLING SYSTEMS

(71) Applicant: Dematic Corp., Grand Rapids, MI (US)

(72) Inventors: Eric Ahlquist, Belding, MI (US); Jeffrey S. DeVries, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 494 days.

(21) Appl. No.: 18/082,677

(22) Filed: Dec. 16, 2022

(65) Prior Publication Data

US 2023/0123861 A1 Apr. 20, 2023

Related U.S. Application Data

(62) Division of application No. 17/034,085, filed on Sep. 28, 2020, now abandoned.

(Continued)

(51) Int. Cl.
*B65D 25/14* (2006.01)
*B65D 21/02* (2006.01)

(Continued)

(52) U.S. Cl.
CPC ......... *B65D 25/14* (2013.01); *B65D 21/0233* (2013.01); *B65D 25/36* (2013.01);

(Continued)

(58) Field of Classification Search
CPC ...... B65G 39/02; B65G 39/067; B65G 39/07; B65G 2201/025; B65G 2207/32;

(Continued)

(56) References Cited

U.S. PATENT DOCUMENTS 3,117,692 A * 1/1964 Carpenter .......... B65D 43/0212  
206/508  
3,498,494 A * 3/1970 Voorhees, Jr. ....... B65D 21/045  
220/23.88

(Continued)

FOREIGN PATENT DOCUMENTS

DE 202009012644 U1 * 12/2009 ............. B65G 39/06

OTHER PUBLICATIONS

Web pages from https://www.kastalon.com/koat-a-roll-products/, accessed as early as Sep. 17, 2019.

(Continued)

*Primary Examiner* — Gene O Crawford  
*Assistant Examiner* — Keith R Campbell  
(74) *Attorney, Agent, or Firm* — Gardner, Linn, Burkhart & Ondersma LLP

(57) ABSTRACT

A sound attenuated material handling element reduces vibration and sound in a material handling system. The material handling element may be a sound attenuated roller for use in a roller conveyer or a sound attenuated nestable tote for receiving and transporting articles in the material handling system. Reducing vibration in material handling element reduces the noise produced by the element. The sound attenuated roller includes sound attenuating material disposed inside of the roller and in contact with the inner surface of the roller body. The sound attenuated nestable tote includes sound dampening material disposed in or formed with the tote structure. The sound damping material may be integrally formed with the roller or tote in order to maximize vibration and noise attenuation. Three dimensional computer analysis may be used to determine optimized locations for placement of the sound damping material on the roller or tote.

17 Claims, 5 Drawing Sheets

Related U.S. Application Data

(60) Provisional application No. 62/906,965, filed on Sep. 27, 2019.

(51) Int. Cl.
| | |
|---|---|
| *B65D 25/36* | (2006.01) |
| *B65G 39/02* | (2006.01) |
| *B65G 39/07* | (2006.01) |
| *G10K 11/162* | (2006.01) |

(52) U.S. Cl.
CPC ............ *B65G 39/02* (2013.01); *B65G 39/07* (2013.01); *G10K 11/162* (2013.01); *B65G 2207/32* (2013.01)
m

(58) Field of Classification Search
CPC .......................... G10K 11/162; B65D 21/0233; B65D 21/045; B65D 25/14; B65D 25/36; B65D 81/1275
See application file for complete search history.

(56) References Cited

U.S. PATENT DOCUMENTS

| | | |
|---|---|---|
| 3,705,455 A | 12/1972 | Lovett |
| 3,724,643 A | 4/1973 | Kohl |
| 4,312,444 A | 1/1982 | Mushovic |
| 4,453,848 A * | 6/1984 | Adkisson ............... B41J 11/053 400/661 |
| 6,820,736 B2 | 11/2004 | Itoh et al. |
| 7,846,081 B2 | 12/2010 | Itoh et al. |
| 9,511,895 B2 * | 12/2016 | Cohen .................... B65D 11/24 |
| 11,091,321 B2 | 8/2021 | Dorok et al. |
| 2006/0180426 A1 | 8/2006 | Scott |
| 2007/0151891 A1 * | 7/2007 | Rioja Calvo ............ B65D 5/30 206/515 |
| 2008/0073362 A1 * | 3/2008 | Richter .................. B65D 25/14 220/694 |

OTHER PUBLICATIONS

Web pages from https://www.megasorber.com/4fold-approach/vibration-damping, accessed as early as Sep. 17, 2019.

* cited by examiner

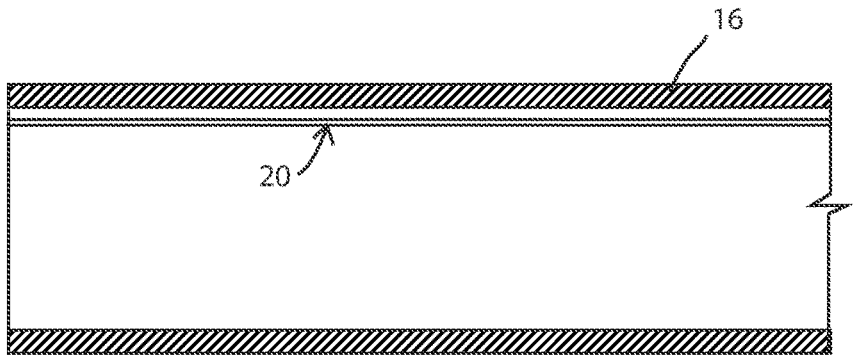
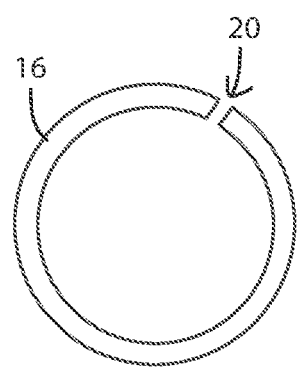
FIG. 3  FIG. 4
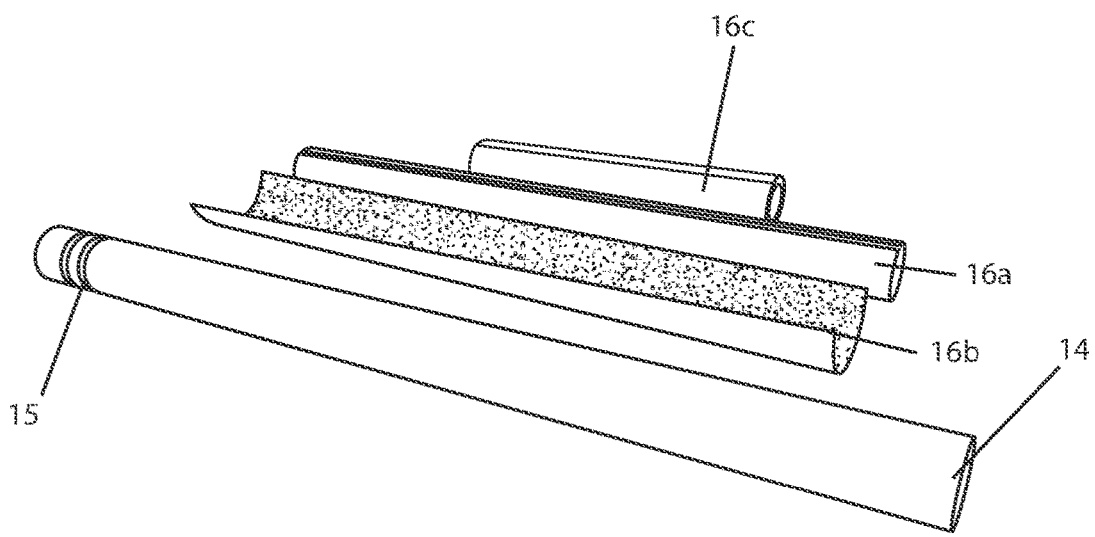
FIG. 5
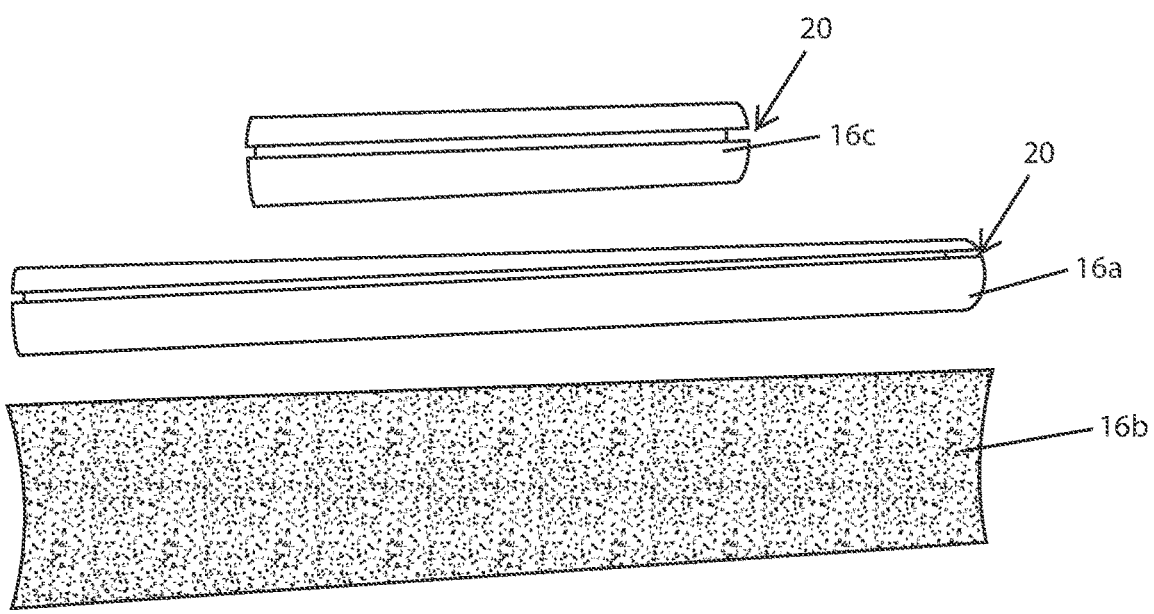
FIG. 6

SOUND ATTENUATION FOR MATERIAL HANDLING SYSTEMS

CROSS REFERENCE TO RELATED APPLICATIONS

The present application is a divisional of U.S. patent application Ser. No. 17/034,085, filed Sep. 28, 2020, which claims priority of U.S. provisional application Ser. No. 62/906,965 filed Sep. 27, 2019, are hereby incorporated herein by reference in their entireties.

FIELD OF THE INVENTION

The present invention is directed to sound attenuation in material handling systems, more particularly for sound attenuation of rollers for conveyors and receptacles for order item processing.

BACKGROUND OF THE INVENTION

Material handling operations produce significant noise, due to various causes, including vibration during operation and manipulation of components of material handling systems. Noise sources include ringing in conveyor rollers due to vibrations in the rollers and impacts with the rollers, as well as rattling and vibration in material handling totes that produce resonance inside the tote. Significant levels of noise are known to cause deleterious health effects for workers and operators inside of material handling facilities.

Rollers in conveyor systems are often coated on the exterior of the rollers to add traction, with some sound attenuation being realized as a secondary benefit of the exterior coating. Applying exterior coatings to rollers often requires swapping existing rollers to rollers with a smaller outer diameter to accommodate the exterior coating while still fitting in the roller clearance of the conveyor system. Receptacles or totes for handling and transporting articles and materials, such as nestable material handling totes, are inherently loud because of their design and/or material. Totes are effectively a resonance chamber and when excited by being dropped or when running over rollers on a conveyor, the tote creates substantial noise, even when full of product. Certain types of material handling totes are formed or molded out of high density polymers, such as high density polyethylene (HDPE) because of HDPE's advantageous durability. Such totes can produce significant noise during conveyance and manipulation of the tote based on the inherent material properties of the tote.

SUMMARY OF THE INVENTION

The present invention provides a sound attenuated material handling element provided for use in material handling and order item processing. The sound attenuated material handling element includes a portion of sound damping material coupled to the material handling element. The sound damping material attenuates vibration and/or noise produced by the material handling element during the material handling process.

According to one form of the present invention, a sound attenuated material handling element in the form of a conveyor roller includes a sound damper, such as a portion of sound damping material, disposed in an interior space of the roller. The portion of sound damping material is in substantially continuous contact with an inner wall of the roller to maximize sound and vibration attenuation. The sound damping material may be a high density polymer, such as high density polyurethane, a vinyl, a mass loaded vinyl, butyl, Hypalon, Viton, or similar sound damping material. In one aspect, a sleeve may be pressed into the inside diameter of the roller tube and additional components of the roller can then be assembled. The assembled roller with sound damping material can be installed with a new roller conveyer system or the assembled roller can replace existing rollers in an existing roller conveyor. Optionally, the sound damping material may be inserted or installed into an existing roller in order to retrofit the existing roller without full replacement. Installing dampening material on the inside of the roller during initial manufacturing of the rollers is a more cost effective form of attenuating sound compared to exterior coating of a roller because a smaller diameter roller is required to accommodate the exterior coating in order to fit into the available roller clearance of the existing conveyor system, which would thus require a new roller in addition to the sound damping material. Time savings for internal sound damping material also provides cost savings because manufacturing time for an internally damped roller is shorter compared to installing an external sleeve of sound damping material on the a roller.

The sound attenuated conveyor roller includes a conveyor roller having a hollow elongate cylindrical body and a sound damper in the form of a portion of sound damping material disposed inside the hollow cylindrical body. The sound damping material is in substantially continuous contact with an inner wall of the roller. The sound damping material may be an elongate c-shape formed of polyurethane. The elongate c-shape includes a split along a longitudinal length of the elongate c-shape. The elongate c-shape has an outer diameter substantially equal to an inner diameter of the roller to ensure that the outer surface of the c-shape is in substantially continuous contact with the inner surface of the roller. In another aspect, the conveyor roller is a tapered roller and the sound damping material is tapered, or formed in an elongate trapezoidal or "pizza" shape, to ensure substantially continuous contact with the inner wall of the tapered roller.

According to another form of the present invention, the sound attenuated material handling element is a nestable material handling tote including a portion of sound damping material disposed on a portion of the tote, such as the side walls or the bottom of the tote. The sound damping material may be a sheet of damping material, such as a constrained layer damping material or a free layer damping material. The sound damping material is disposed on the nestable tote such that the sound damping material does not interfere with the nesting functionality of the totes.

In one aspect, the sound attenuated tote is provided for use in a material handling system. The sound attenuated tote is configured to receive articles to be handled by the material handling system and a portion of sound damping material is disposed on a portion of the material handling tote. The material handling tote may be formed from a high density polymer, such as high density polyethylene.

In another aspect, a constrained layer damping material is disposed on an interior portion of a bottom of the material handling tote. The constrained layer damping material comprises a layer of damping material, a layer of adhesive disposed on one side of the layer of damping material, and a constraining layer on the opposite side of the layer of damping material. The constraining layer may be a resilient material, such as a flexible metal or a flexible plastic that is resistant to wear from articles in the tote.

In yet another aspect, the portion of sound damping material may be injected or inserted into a pocket or recess in the tote, the pocket or recess may be defined by a plurality of ribs disposed on the material handling tote. The portion of sound damping material may be disposed at a location on the material handling tote corresponding to an antinode of vibration of the material handling tote. An antinode represents the maximum displacement in a standing wave of vibration of the tote.

In one aspect, the material handling tote is a stack and nest tote configured to stack on top of another material handling tote in one orientation and configured to nest inside of another material handling tote in a different orientation, such as rotated one hundred and eighty degrees about a vertical axis relative to the other material handling tote. The sound damping material is disposed on the stack and nest tote such that the sound damping material does not interfere with the stack and nest functionality of the totes.

According to another form of the present invention, a sound attenuated tote is provided for use in a material handling system. The sound attenuated tote includes a material handling tote configured to receive articles to be handled by the material handling system and a plurality of structural rib supports disposed on the material handling tote. The plurality of rib supports are disposed on locations of the material handling tote corresponding to antinodes of vibration of the material handling tote. The material handling tote and plurality of rib supports are formed from a sound damping material.

In one aspect, the material handling tote of the sound attenuated tote is a stack and nest tote, wherein the stack and nest tote is configured to stack on top of another material handling tote in one orientation and configured to nest inside of the other material handling tote in a different orientation, such as when rotated one hundred and eighty degrees about a vertical axis relative to the other material handling tote.

Therefore, the present invention provides a sound attenuated roller for use in a roller conveyer to reduce vibration experienced in the roller and thereby reduce noise produced by the vibration of the roller. The present invention provides a sound attenuated tote for use in a material handling operation. The sound attenuated tote is configured to reduce vibration experienced by a tote during handling and manipulation during material handling operations. Reducing the vibration in turn reduces the noise produced by the tote. Various materials may be used to provide sound damping properties to the roller and the tote, such as polyurethane, high density polyethylene, vinyl, mass loaded vinyl, butyl, Hypalon, and Viton. Various configurations of sound damping material may be utilized including constrained layer damping material and free layer damping material determined based on the need for resiliency properties in the sound damping material. The sound damping material may be integrally formed with the roller or tote in order to maximize vibration and noise attenuation. Three dimensional computer analysis may be used to determine the locations for placement of the sound damping material on the roller or tote.

These and other objects, advantages, purposes, and features of the present invention will become more apparent upon review of the following specification in conjunction with the drawings.

BRIEF DESCRIPTION OF THE DRAWINGS

FIG. 3 is a longitudinal cross-sectional view of the sound damper FIG. 1;

FIG. 4 is an axial cross sectional view of the sound damper of FIG. 1;

FIG. 5 is a perspective view of a conveyor roller and various sound damping materials for use with a roller;

FIG. 6 is another perspective view of the sound damping materials of FIG. 5;

DETAILED DESCRIPTION OF THE PREFERRED EMBODIMENT

Figure 1:
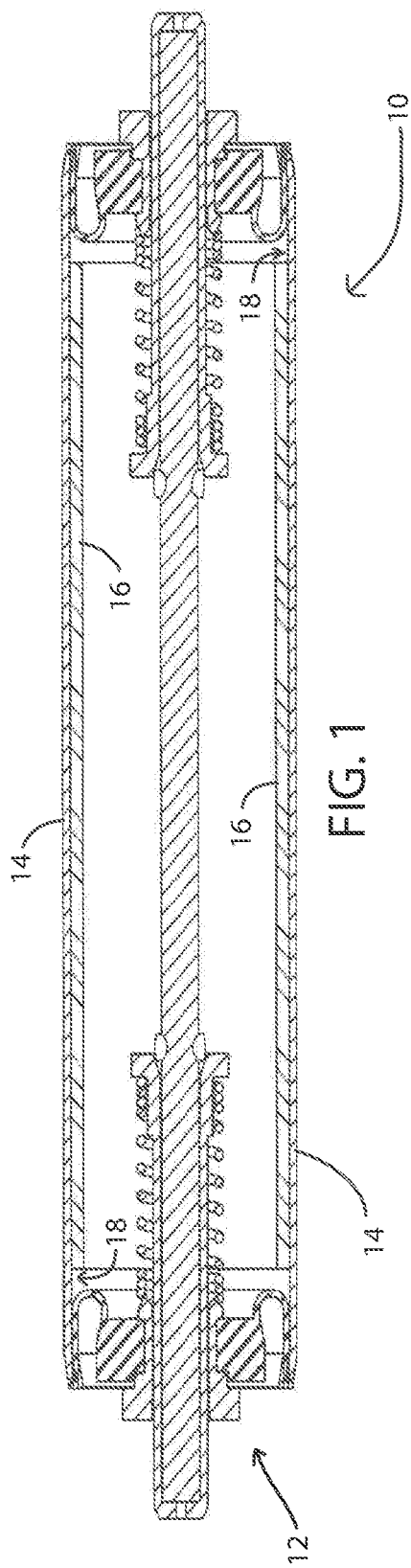
FIG. 1 is a cross-sectional view of a conveyor roller with a sound damper disposed on the interior of the roller in accordance with the present invention.
Figure 2:
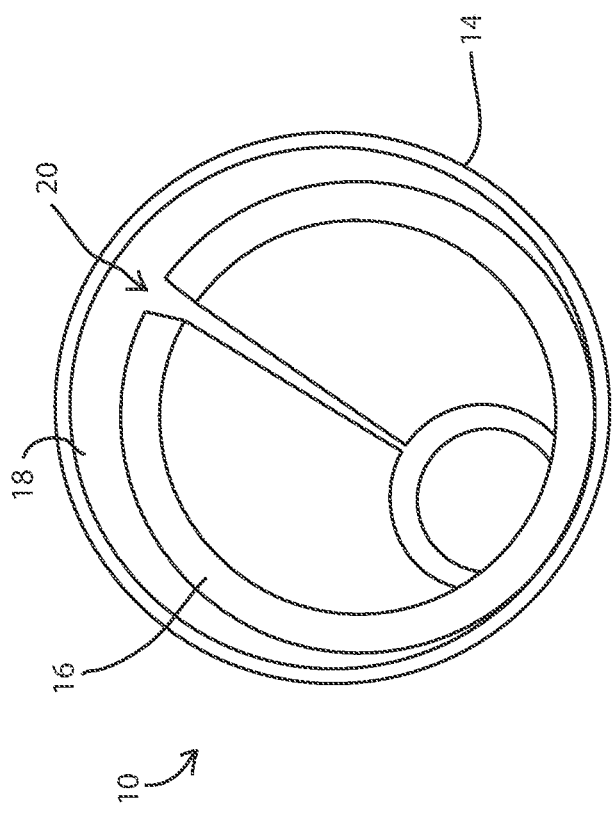
FIG. 2 is a perspective view of a conveyor roller casing of the conveyor roller of FIG. 1 with the sound damper disposed on the interior of the roller casing.

Referring now to the drawings and the illustrative embodiments depicted therein, a sound attenuated or damped roller apparatus 10 and a sound attenuated or damped material handling tote or bin 110 are provided for reducing sound during operation of conveyor type material handling systems, such the sound produced as a tote 110 moves along a conveyor roller system. In the illustrated embodiments of FIGS. 1-6, the roller apparatus 10 includes a conveyor roller assembly 12 with a metal roller, casing, or tube 14 defining an exterior roller surface for supporting articles (e.g. totes, receptacles, boxes, or individual items) as they are transported along the conveyor roller system (FIGS. 1-2). A sound damper 16, such as a sound damping material, is disposed on the interior of the roller 14. The roller apparatus 10 may be provided with new conveyor systems or for retrofit applications to sound-attenuate rollers in existing conveyor systems. In a preferred embodiment, the sound-attenuated roller apparatus 10 is provided to replace a roller of an existing roller conveyor system, e.g. the existing roller is removed and replaced with the roller apparatus 10 having the damping material 16 disposed within. The placement of the sound damping material 16 on the interior of the roller 14 allows the existing rollers to be replaced with the internally sound damped roller apparatus 10 without causing interference or spacing conflicts with the conveyor or the other rollers. Replacing existing rollers with exterior applied sound damping material would require a reduced outer diameter of the roller to provide adequate clearance between adjacent rollers with exterior sound damping material. The sound damping material 16 reduces vibration in the roller 14 which thereby reduces noise and sounds. Although the illustrative embodiments of the sound attenuating material 16 are shown with a conveyor roller 14, other embodiments are contemplated, including for use with wheels and casters. It will be appreciated that the roller assembly 12 may include any suitable roller assembly for use in a roller conveyor system, such as commercially available conveyer rollers or the like.

The sound damping material 16 extends longitudinally along and in contact with the interior walls of the roller 14, such that the material 16 is in substantially continuous contact with the interior wall 18 of the roller 14. Continuous contact between the sound damping material 16 and the interior wall 18 of the roller provides the greatest sound damping effect for the roller 14. As illustrated in FIGS. 2 and 4, the sound damping material 16 may include a split or gap 20 disposed longitudinally along the length of the material 16. The split 20 provides a relief section during installation of the material 16 into the interior of the roller 14, such that the material 16 can be at least partially compressed into a smaller diameter than the inner diameter of the roller 14. Thereby allowing the material 16 to enter into the interior of the roller 14. The sound damping material 16 is resilient such that after it is compressed to enter the roller 14 it then returns to its original shape, or at least as far as allowed by the inner wall 18 of the roller 14. The material 16 may be press-fit into the interior of the roller 14. The material 16 may be molded or extruded to meet a tolerance to provide substantially continuous contact between the material 16 and the interior wall of the roller 14. The sound damping material 16 is in contact with a majority of the surface of the inner wall of the roller 14, and preferably is in contact with substantially all of the surface of the inner wall of the roller 14 along the entire length of the roller 14 to provide maximum sound attenuation effects. Optionally, the roller 14 may include one or more grooves 15 to receive drive belts to drive the roller 14 and the damping material 16 may be terminated at the interior of the roller 14 adjacent to the belt groove 15 (FIG. 5). Alternatively, the damping material may be positioned on or over the belt groove 15 as desired for sound damping and rotational properties of the roller 14.

In the illustrated embodiments of FIGS. 1-6, the sound damping material 16 is an elongate c-shaped sleeve that is substantially the same length as the roller 14. The c-shaped sleeve includes a split or cut 20 formed as a gap or opening along the longitudinal length of the sleeve. The sound damping material 16 is formed of an at least partially resilient material having sound damping properties, such as polyurethane, vinyl, mass-loaded vinyl, or the like. As best shown in FIGS. 5 and 6, the sound damping material 16 may be formed from an elongate c-shaped sleeve of polyurethane 16a, mass loaded vinyl 16b, or vinyl 16c. Preferably, the sound damping material 16 is polyurethane. Optionally, sound damping material can be injected into the interior of the conveyor roller 14, such as a foam injected into the roller 14. The material 16 is uniformly disposed along the interior surface of the roller 14 such that no overlaps in the material 16 occur, which may affect the rotational balance and efficiency of the roller 14. The split 20 in the sound damping material 16 is chosen to minimize the width of the split while allowing for easy insertion into the roller 14. If the split 20 is too wide, the rotational balance of the roller 14 can be effected and unbalanced. Optionally, the sound damping material 16 may be applied in strips to the interior wall 18 of the roller 14, however, a c-shaped sleeve is preferred for rotational balance and sound attenuation optimization. While a c-shaped sleeve having a split 20 is particularly beneficial for purposes of installation of the sound damping material 16, it will be appreciated that the sound damping material may be formed of a unitary sleeve of resilient sound damping material or in other configurations to provide sufficient sound damping properties while being readily installable in a roller 14. The sound damping material 16 can be formed to be used with tapered rollers wherein the sound damping material 16 is defined by an elongated trapezoid shape, or "pizza" shape. The dimensions of the elongated trapezoid shape are chosen as a function of the length and taper of the roller in which the sound damping material 16 is to be disposed in.

Figure 7:
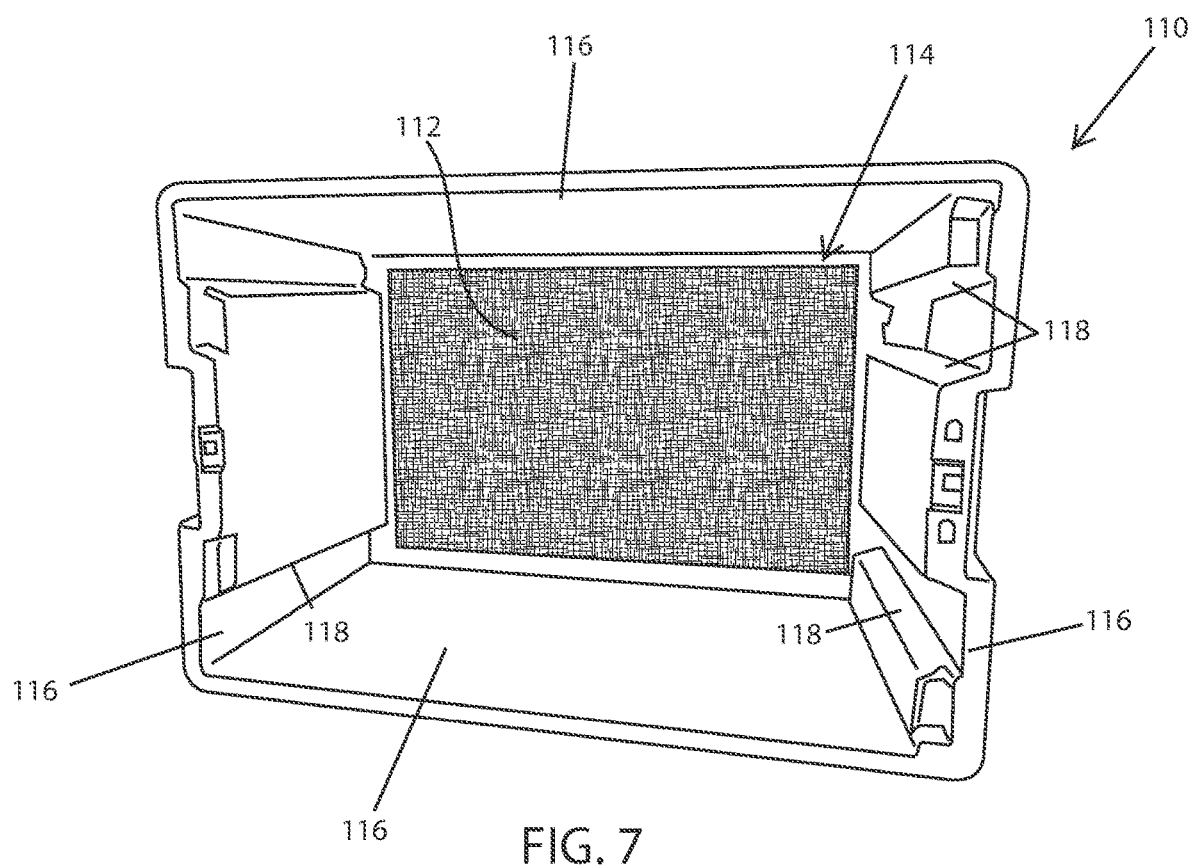
FIG. 7 is a perspective view of a material handling tote with sound damping material disposed on an interior of the tote in accordance with the present invention.
Figure 8:
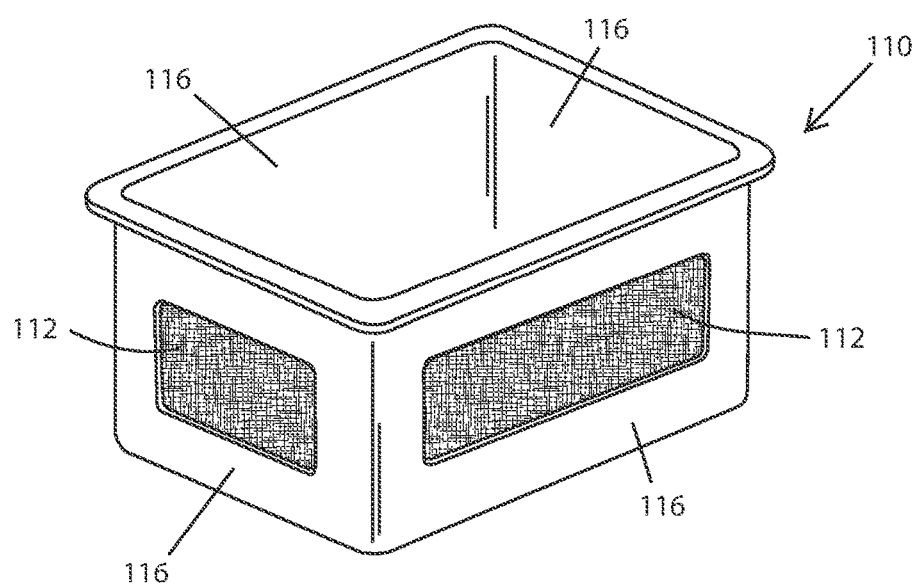
FIG. 8 is a perspective view of a material handling tote with sound damping material disposed on an exterior of the tote in accordance with the present invention.

In the illustrated embodiment of FIGS. 7-8, a material handling tote or bin 110 for use in a material handling system, includes sound attenuating or damping material 112 disposed on a portion of the tote 110. The sound attenuating material 112 is provided to reduce noise and vibration of the tote 110. The sound damping material may be disposed on a bottom 114 and/or sides 116 of the tote 110. In the illustrated embodiment of FIG. 7, the sound damping material 112 is disposed on an interior side of a bottom 114 of the tote 110. The material 112 may be disposed on either surface of the bottom 114, although the longevity of the material 112 is increased by disposing the material 112 on the interior side of the bottom 114. In the illustrated embodiment of FIG. 8, the material 112 is disposed on the side 116 of the tote 110.

The material handling tote 110 is a nestable tote that is nestable inside of another material handling tote 110 while allowing another material handling tote 110 to nest inside of itself. The sound damping material 112 is disposed on the nestable tote 110 such that the sound damping material 112 does not interfere with the nesting functionality of the totes 110. Optionally, the material handling tote 110 may also be a stack and nest tote that can stack on top of another material handling tote in one orientation and can nest inside of the other material handling tote in a different orientation, such as rotated ninety degrees (90°) or one hundred and eighty degrees) (180°) about a vertical axis. The sound damping material 112 is disposed on a stack and nest tote such that the material 112 does not interfere with the stacking and nesting of the tote with another tote.

Figure 10:
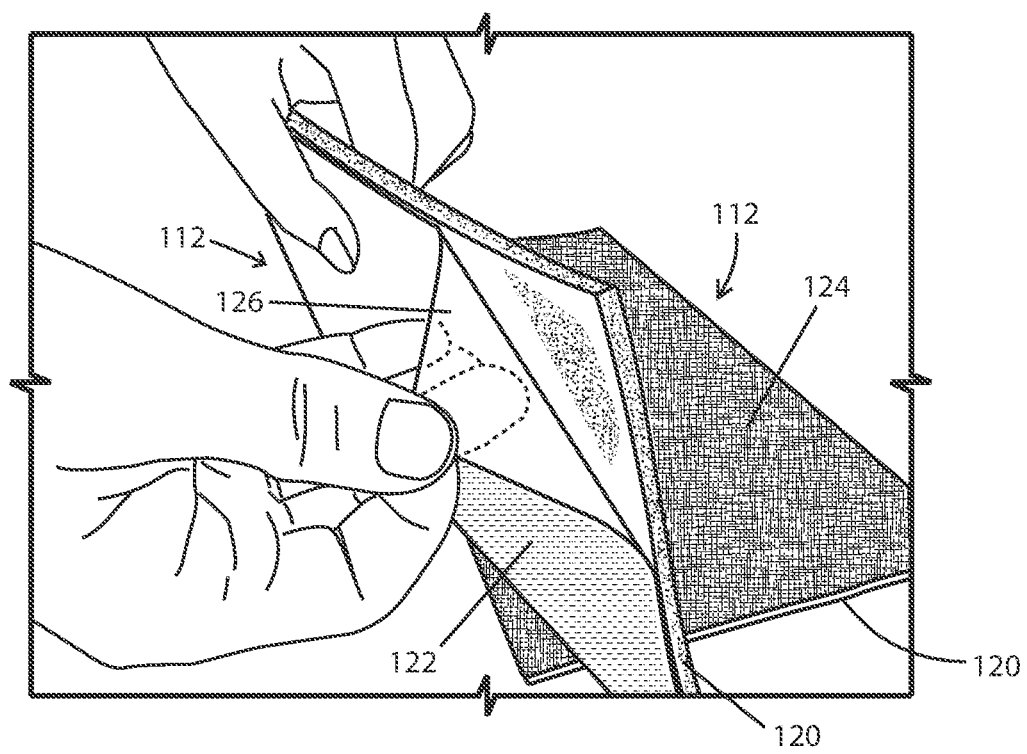
FIG. 10 is a perspective view of a portion of a sound damping material.

In the illustrated embodiments of FIGS. 7 and 10, the sound damper 112 is a sheet of sound damping material. The sheet of damping material 112 may be constrained layer damping material or free layer damping material. Constrained layer damping material includes a layer of damping material 120 disposed between two layers of either non-damping or less-damping material, such as an adhesive layer 122 and a resilient or constraining layer 124. The constraining layer 124 may provide structural stiffness and wear resistance to the damping material 120, such as to prevent wear to upper portion of the damping material from items disposed in the tote 110. The adhesive layer 122 may be supplied with a film 126 to be removed before placement of the material 112 on the tote 110. Free layer damping material (not shown) includes a layer of damping material that is not constrained on its top side. Free layer damping material may include a layer of adhesive disposed on one side of the damping material. Alternatively, instead of providing an adhesive layer 122 to the constrained layer damping material or the free layer damping material, an adhesive may be impregnated in the damping material layer 120.

Figure 9:
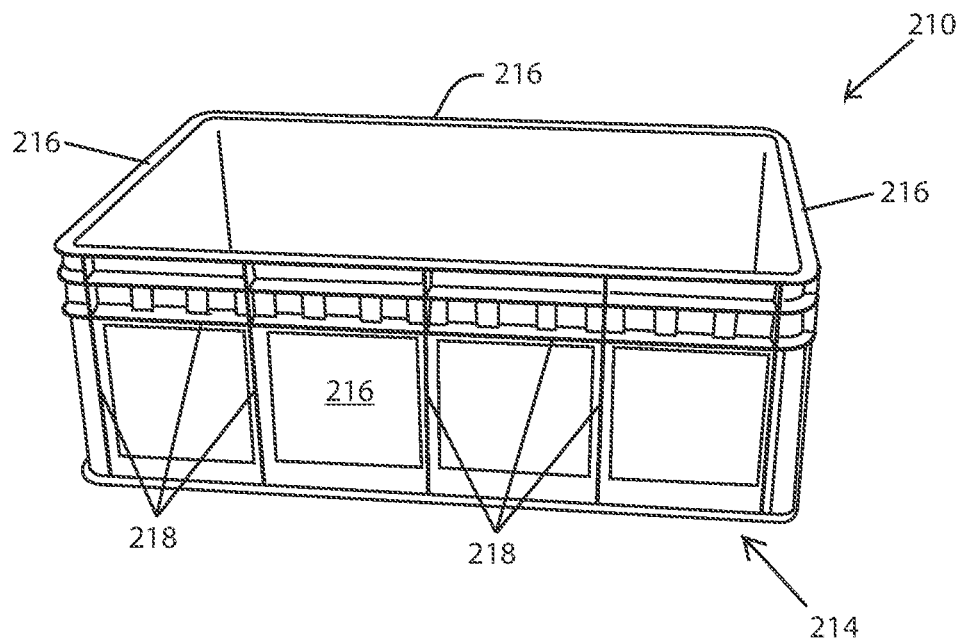
FIG. 9 is a perspective view of a material handling tote.
Figure 12:
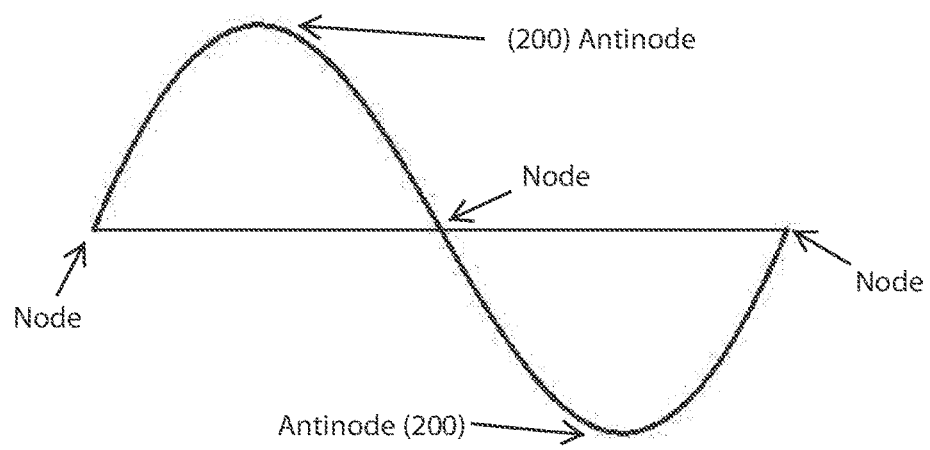
FIG. 12 is a graphical depiction of a sound wave.

A sound attenuated material handling tote or bin having sound attenuating or damping ribs and stiffeners integrally formed or molded with the tote to provide structural resilience and stiffness to the tote while providing optimal sound damping qualities to the tote. An exemplary tote 210 typically used in material handling operations in shown in FIG. 9. The tote 210 includes integrally formed ribs and stiffeners 218. It is contemplated that the ribs 218 are positioned at optimal locations along the tote 210, the optimal positioned of the ribs 218 provides sound damping qualities to the tote 210, such as at locations on the tote that correspond to antinodes 200 (i.e. the position of maximum displacement in a standing wave of vibration of the tote), as illustrated in FIG. 12. In commonly available material handling totes, such as tote 210, the ribs 218 are positioned on a strictly structural bases without consideration for sound damping. The contemplated sound attenuated tote may be a non-nesting, a nesting type, or a stack and nest type tote.

Alternatively or additionally, sound dampers in the form of portions of sound damping material may be removably or unitarily disposed in recesses, pockets or voids formed on the tote, such as those defined by ribs 218 in the walls 216 or bottom 214 of tote 210 to reduce vibration and noise. The sound damping material may be disposed at locations on the tote that correspond to antinodes of the tote 210. An injectable sound damping material, such as a foam, two part epoxy, or rubber, may be injected or dispensed into recesses, pockets or voids defined by ribs 218 in the walls 216 or bottom 214 of the tote 210 to reduce vibration and noise. Additional ribs or stiffeners 218 may be integrally formed on the structure of the tote 210. The additional ribs 218 may be located at locations of antinodes of the tote 210.

Figure 11:
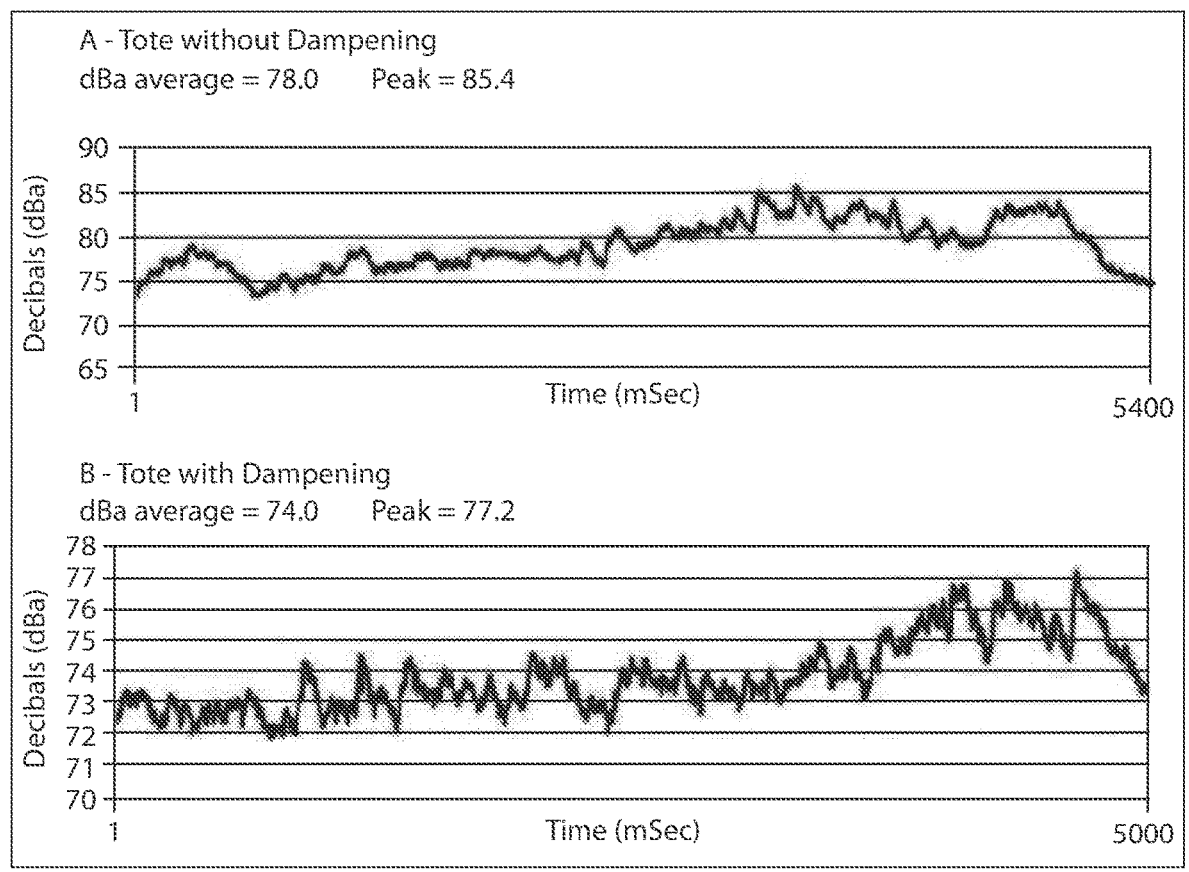
FIG. 11 is a graph comparing sound in decibels over time produced by an undamped tote to sound in decibels over time produced by a damped tote.

The locations of antinodes 200 may be identified by three-dimensional computer analysis of the tote 210. Optionally, a sound attenuated tote may be formed or molded from a sound damping material with a structure of the tote designed based on a three-dimensional vibration and sound analysis to reduce vibration and sound in the tote. As illustrated in graphs A and B in FIG. 11, a tote with sound damping material disposed thereon displays significantly decreased decibel levels relative to the same tote without sound damping material. The graphs in FIG. 11 depict a comparison of sound in decibels over time (in milliseconds) produced by an undamped tote to sound in decibels over time (in milliseconds) produced by a damped tote, wherein each tote was recorded as it repetitively passed over a section of a roller conveyor.

Accordingly, the present invention provides sound attenuated conveyor apparatuses and sound attenuated material handling apparatuses for reducing noise produced during material handling operations. A conveyor roller includes a sound damping or attenuating material disposed on an inside of the roller. The damping material is configured to contact substantially all of the surface of the interior wall of the roller. The contact between the damping material and the roller inner wall reduces vibrations which cause noise in the roller. A tote is provide with sound damping or attenuating material disposed on various surfaces of the tote. The sound damping material reduces vibration in the tote structure and thereby reduces noise from the tote. Three dimensional testing and analysis may be utilized to determine optimal placement locations for the sound damping material for the tote and for the roller.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A sound attenuated tote for material handling, said sound attenuated tote comprising:
   a nestable material handling tote comprising a rigid body defining an interior configured to receive and transport articles;
   a sound damper disposed at a portion of said tote, said sound damper comprising a sound damping material configured to attenuate at least one chosen from vibration and noise at said tote during handling of said tote;
   said material handling tote comprises a recess integrally formed at a portion of said rigid body and configured to receive said sound damper;
   wherein said material handling tote is nestable with another of said material handling tote.

2. The sound attenuated tote of claim 1, wherein said sound damping material comprises a constrained layer damping material disposed along a surface of said material handling tote.

3. The sound attenuated tote of claim 2, wherein said constrained layer damping material comprises a resilient material at an upper portion of said damping material.

4. The sound attenuated tote of claim 1, wherein said sound damping material is disposed at a recess defined between a plurality of ribs disposed on said material handling tote.

5. The sound attenuated tote of claim 1, wherein said sound damping material is disposed at a location on said material handling tote corresponding to an antinode of vibration of said material handling tote.

6. The sound attenuated tote of claim 1, wherein said nestable material handling tote comprises a stack and nest tote, wherein said stack and nest tote is configured to stack on top of another of said material handling totes in one orientation and configured to nest inside of said another material handling tote in a different orientation.

7. A sound attenuated tote for use in a material handling system, said sound attenuated tote comprising:
   a stack and nest material handling tote configured to receive articles to be handled and transported within the material handling system; and
   a plurality of ribs disposed on said material handling tote, said plurality of ribs disposed at respective locations of said material handling tote corresponding to antinodes of vibration of said material handling tote;
   wherein said material handling tote is nestable with another of said material handling totes in one orientation and stackable on another of said material handling totes in a different orientation; and
   wherein said plurality of ribs are configured such that said ribs do not interfere with the nesting of said material handling tote with another of said material handling totes.

8. The sound attenuated tote of claim 7, wherein a body of said nestable material handling tote and said plurality of ribs comprise a sound damping material.

9. The sound attenuated tote of claim 7, further comprising a sound damper disposed at a recess defined between two or more of said plurality of ribs of said nestable material handling tote.

10. A sound attenuated conveyor system comprising:
    a nestable material handling tote comprising a rigid body defining an interior configured to receive and transport articles;
    a tote sound damper disposed at a portion of said tote, said tote sound damper comprising a tote sound damping material configured to attenuate at least one chosen from vibration and noise at said tote during handling of said tote, said material handling tote comprises a recess integrally formed at a portion said rigid body and configured to receive said tote sound damper, wherein said material handling tote is nestable with another of said material handling tote;

a conveyor roller having a hollow elongate cylindrical body, and a roller sound damper disposed at an interior of said cylindrical body in a manner to form a press-fit relationship with an inner wall of said conveyor roller such that said roller sound damper is in continuous contact with a portion of the inner wall of said conveyor roller, wherein said roller sound damper comprises a roller sound damping material configured to attenuate vibration at said conveyor roller during operation of the conveyor system.

11. The sound attenuated conveyor system of claim 10, wherein said roller sound damper comprises an elongate c-shape formed of the sound damping material, said elongate c-shape having a split disposed along a longitudinal length of said roller sound damper, wherein said elongate c-shape has an outer diameter substantially equal to an inner diameter of said roller.

12. The sound attenuated conveyor system of claim 10, wherein said roller sound damper comprises one chosen from a molded roller sound damping material and an extruded roller sound damping material.

13. The sound attenuated conveyor system of claim 10, wherein the roller sound damping material comprises one chosen from polyurethane, polyethylene, vinyl, mass-loaded vinyl, butyl, rubber, polymer, and elastomer.

14. The sound attenuated conveyor system of claim 10, wherein said roller sound damper is positioned at the interior of said conveyor roller in a manner that provides optimal rotational efficiency of said sound attenuated conveyor roller.

15. The sound attenuated conveyor system of claim 10, wherein said roller sound damper terminates adjacent to a belt groove disposed at said cylindrical body of said conveyor roller.

16. The sound attenuated conveyor system of claim 10, wherein said conveyor roller comprises an elongated conical cylindrical body such that said conveyor roller is tapered.

17. The sound attenuated conveyor system of claim 16, wherein said roller sound damper comprises a taper to form substantially continuous contact with said inner wall of said tapered conveyor roller.

\* \* \* \* \*